Feb. 5, 1924.

J. F. JOHNSON

CUT-OFF DEVICE FOR VACUUM PIPE LINES

Filed Jan. 18, 1923

1,482,848

Inventor
J. F. Johnson
by Langner, Parry, Card & Langner
Attys.

Patented Feb. 5, 1924.

1,482,848

UNITED STATES PATENT OFFICE.

JOHN FRANK JOHNSON, OF EKETAHUNA, WELLINGTON, NEW ZEALAND.

CUT-OFF DEVICE FOR VACUUM PIPE LINES.

Application filed January 18, 1923. Serial No. 613,539.

*To all whom it may concern:*

Be it known that I, JOHN FRANK JOHNSON, a citizen of the Dominion of New Zealand, residing at Main Street, Eketahuna, in the Provincial District of Wellington, New Zealand, have invented an Improved Cut-Off Device for Vacuum Pipe Lines, of which the following is a specification.

This invention relates to means employed in vacuum pipe lines, and particularly to devices employed in vacuum and milk pipe lines of milking machines for preventing a sudden inrush of air to the system, on a teat cup or teat cups leaving a teat or teats of a animal being milked and provides an improved device for the aforesaid purpose.

According to the invention the improved device comprises a casing or body having nipples projecting from opposite sides, one of said nipples or a passage continuing therefrom extending into the casing or body nearly to the side opposite that from which the nipple projects.

The other of said nipples or a passageway forming a continuation thereof also extends into the casing or body nearly to the side opposite that from which it projects, the inner end of said nipple or passageway opening into a cross passage provided between the outer portion of the casing or body and an inner cross wall therein.

A race formed between the walls of the nipples or the walls of the passageways in continuation thereof accommodates a valve capable of closing on a seating provided in the inner side of said inner cross wall, said seating containing one or more niches, whereby the port which it surrounds is never completely closed by the valve.

Means are also provided whereby the valve can be prevented from closing on its seating when desired.

In the accompanying drawing in conjunction with which the invention will be further described:—

Figure 1:
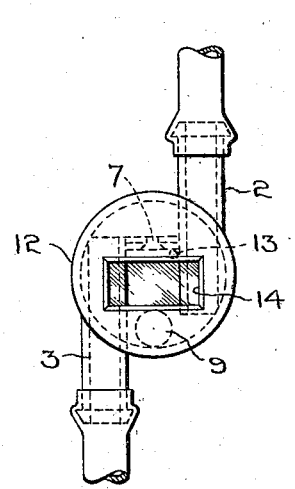
Figure 2:
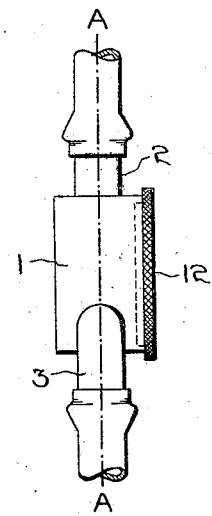

Figure 1 is a front view,

Figure 2 a side view of the improved device, while

Figure 3:
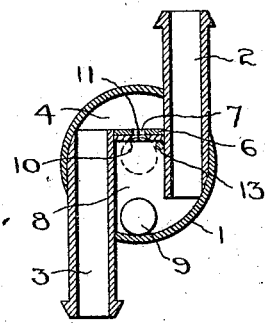

Figure 3 is a sectional elevation on the line A—A, Figure 2.

In the drawing 1 is the casing or body which is preferably but not necessarily circular, 2 is the nipple which is inserted in the pipe line nearest the teat cup, or teat cups, and 3 the other nipple used nearest the teat cup's claw or the air exhauster.

The nipple 2 or a passageway continuing therefrom extends into the casing or body nearly to the side of the latter opposite that from which the nipple projects.

The other nipple 3 which projects from the opposite side of the casing or body 1 from which the nipple 2 projects, or a passageway continuing from said nipple 3 extends into the casing or body 1, to connect with a short cross passage 4 formed between the outer portion of the casing or body 1 and an inner cross wall 6 therein, the latter containing a port 7.

The extension of the nipples 2 and 3 into the casing or body 1, or the walls of the passageways continuing inwards from said nipples, 2, 3 form a race 8 which accommodates a valve 9 preferably a ball valve, the latter being prevented by its size from getting between the inner end of the nipple 2 or the passageway continuing therefrom and the outer portion of the casing or body 1.

Surrounding the port 7 in the inner cross wall 6 and on the inner side of the latter is a seating 10 containing one or more niches 11 or formed so that the valve never completely closes said port 7.

One side 12 of the casing or body is made removable, and is provided on its inner side with a projection 13, said side 12 being capable of being placed on the casing or body 1 in such a manner that the projection 13, can be caused to hold the valve 9 away from its seating 10.

The side 12 can also if desired contain an opening 14 covered with transparent material suitably protected.

In action, as long as the teat cup or teat cups remain properly on the teat or teats and are sealed thereby against the admission of air, and milk is passing through the device, the valve 9 keeps off its seating 10, but immediately a teat cup or cups comes off a teat or teats, the inrush of air to the casing or body 1 through said cup or cups and nipple or nipples, 2 connected therewith results in the valve 9 being forced on to its seating 10 and almost completely closing the port 7 around which the seating 10 is formed.

The leakage permitted by the niches 11 when the valve 9 is on its seating, enables the pressures at each side of the valve 9 to be equalised, when the teat cup or cups are replaced on the teat or teats, whereupon the valve 9 moves off its seating 10 and allows milk to again pass through the device.

The device can be used in any suitable position in a vacuum pipe line and more particularly in the tubes connecting the teat cups with the claws, or in the tubes connecting the latter with the main pipe lines.

What I do claim and desire to obtain by Letters Patent of the United States of America is:—

1. A device for the purpose specified comprising, a body, nipples extending into the body from opposite sides thereof and forming a runway, a valve operating in said runway, a cross passage connecting with one of the said nipples, and a port opening into said cross passage, and controlled by said valve.

2. A device for the purpose specified comprising a body; nipples extending into the latter from opposite sides; a valve operating between the inner portions of said nipples; a cross passage between the outer portion of the body and an inner wall therein, containing a port; and a valve seating containing niches surrounding said port on the inner side of said cross wall.

3. A device for the purpose specified comprising: a body, a removable side on the latter containing a sight opening; nipples extending into the body from opposite sides; a valve operating in a race between the inner portions of said nipples; a cross passage between the outer portion of the casing and an inner cross wall containing a port; a valve seating containing niches, surrounding said port on the inner side of said cross wall, and a projection on the inner side of the removable side of the body capable of being set to keep the valve away from its seating.

In testimony whereof I have signed my name to this specification.

JOHN FRANK JOHNSON.